United States Patent [19]
Steinleitner et al.

[11] Patent Number: 4,853,303
[45] Date of Patent: Aug. 1, 1989

[54] ELECTROCHEMICAL STORAGE CELL

[75] Inventors: Gunther Steinleitner, Schriesheim; Stefan Mennicke, Leimen-Gauangelloch; Philbert Feindler, St. Leon-Rot; Herbert Klein, Frankenthal; Sigisfredo Maldonado-Zagal, Edingen-Neckarhausen, all of Fed. Rep. of Germany

[73] Assignee: BBC Brown Boveri Aktiengesellschaft, Mannheim, Fed. Rep. of Germany

[21] Appl. No.: 192,955

[22] Filed: May 12, 1988

[30] Foreign Application Priority Data

May 19, 1987 [DE] Fed. Rep. of Germany ....... 3716735

[51] Int. Cl.$^4$ .......................................... H01M 10/39
[52] U.S. Cl. ................................................. 429/104
[58] Field of Search ..................... 429/104, 102, 94

[56] References Cited

U.S. PATENT DOCUMENTS

| | | | |
|---|---|---|---|
| 4,066,826 | 1/1978 | Jones et al. | 429/104 |
| 4,076,902 | 2/1978 | Senoo | 429/104 |
| 4,125,682 | 11/1978 | Bordet et al. | 429/104 |
| 4,405,696 | 9/1983 | Fischer et al. | 429/104 |
| 4,683,179 | 7/1987 | Langpape et al. | 429/104 |

Primary Examiner—Anthony Skapars
Attorney, Agent, or Firm—Herbert L. Lerner; Laurence A. Greenberg

[57] ABSTRACT

An electrochemical storage cell based on sodium and sulphur includes a metallic housing. A solid electrolyte disposed in the housing defines an anode space and a cathode space mutually separated by the solid electrolyte and outwardly bounded by the housing. A felt is disposed in the cathode space to form an electrode. The felt is impregnated with sulphur and folded at least twice. The felt has graphite or carbon fibers disposed substantially perpendicular to the longitudinal axis of the storage cell and substantially perpendicular to the surface of the solid electrolyte.

11 Claims, 2 Drawing Sheets

ELECTROCHEMICAL STORAGE CELL

The invention relates to an electrochemical storage cell based on sodium and sulphur with an anode space and a cathode space mutually separated by a solid electrolyte and outwardly bounded by a metallic housing, a felt impregnated with sulphur and having graphite or carbon fibers is disposed in the cathode space to form an electrode.

Such electrochemical storage cells are very well suited for constructing high-temperature storage batteries which are provided as power supplies for electric vehicles. An example of this is rechargeable storage cells based on sodium and sulphur which have a solid electrolyte of beta aluminum oxide that separates the anode space from the cathode space. An advantage of electrochemical storage cells is that no electrochemical side reactions occur during charging. The reason for this is that only sodium ions can pass through the solid electrolyte. The current efficiency of such sodium/sulphur storage cells is therefore 100%.

German Published, Non-Prosecuted Application DE-OS No. 34 25 859 discloses an electrochemical storage cell in which a felt that is impregnated with sulphur is disposed in the cathode space, in order to form the sulphur electrode. The felt is formed by carbon or graphite fibers based on pitch. In order to obtain a felt which has a low electrical resistance, considerable expenses have to be incurred. Firstly, a composite body which is consolidated by an inert or carbonisable material has to be laminated from the fiber threads In this process, the fibers are disposed in such a way that they extend essentially parallel to each other. Subsequently, slices are cut from the composite body so formed in such a manner that the cut surfaces extend perpendicular to the longitudinal axes of the fibers. The slices thus separated are inserted into the cathode space of the storage cell. As a result of the special structure of the composite body and of the slices formed therefrom, the fibers extend perpendicular to the longitudinal axis of the storage cell after the felt is inserted, as a result of which a low electrical resistance of the felt is achieved. A considerable disadvantage of the felt is the expensive manufacture thereof. In spite of the expensive manufacture, the felt does not have the necessary restoring forces which are achieved when somewhat differently constructed felts formed of cellulose or polyacrylonitril are used.

It is accordingly an object of the invention to provide an electrochemical storage cell, which overcomes the hereinaforementioned disadvantages of the heretoforeknown devices of this general type and in which the felt that also forms the sulphur electrode has the required electrical resistance and possesses the necessary restoring forces.

With the foregoing and other objects in view there is provided, in accordance with the invention, an electrochemical storage cell based on sodium and sulphur, comprising a metallic housing, a solid electrolyte disposed in the housing and defining an anode space and a cathode space mutually separated by the solid electrolyte and outwardly bounded by the housing, and a felt disposed in the cathode space to form an electrode, the felt being impregnated with sulphur and folded at least twice and preferably several times, and the felt having graphite or carbon fibers disposed substantially perpendicular to the longitudinal axis of the storage cell and substantially perpendicular to the surface of the solid electrolyte.

According to the invention, graphite-fiber or carbon-fiber mats which are manufactured from pitch are used to form the sulphur electrode. In the manufacture of the mats, the fibers are disposed in such a manner such that they extend essentially parallel to each other. Before the :rat is inserted into the cathode space, it is folded. The folds are disposed in such a way that the longitudinal axes thereof extend perpendicularly to the longitudinal axes of the fibers.

In accordance with another feature of the invention, the felt is formed of a continuous mat, the fibers are mutually parallel inside the mat, and the felt has folds with a ratio of width to height of substantially between 0.2:1 and 2:1 and preferably substantially between 0.5:1 and 1:1.

The mat thus folded is inserted into the cathode space in a manner such that the fibers extend perpendicularly to the longitudinal axis of the storage cell because of the folds formed therein. Due to the disposition of the folds described above, two possibilities emerge for inserting the folded mat into the cathode space and at the same time, for achieving the desired disposition of the fibers. On one hand, there is the possibility of inserting the felt into the cathode space in such a way that the longitudinal axes of the folds extend parallel to the longitudinal axis of the storage cell. In the second possible disposition, the longitudinal axes of the folds are disposed annularly around the longitudinal axis of the storage cell.

Therefore, in accordance with a further feature of the invention, the folds extend substantially perpendicular to the longitudinal axis of the mat.

In accordance with an added feature of the invention, the felt inside the cathode space has folds with longitudinal axes extending annularly around the longitudinal axis of the storage cell.

In accordance with an additional feature of the invention, the felt inside the cathode space has folds with longitudinal axes extending parallel to the longitudinal axis of the storage cell.

In accordance with yet another feature of the invention, the felt forming the electrode is formed of a plurality of felt pieces having folds, the length of the felt pieces and the width of the folds having a ratio substantially between 5:1 and 20:1 and preferably substantially 10:1. Several part pieces are inserted into the cathode space instead of a single mat in order to obtain as low an ohmic resistance of the felt as possible and very high restoring forces under these circumstances.

In accordance with yet a further feature of the invention, substantially between 5 and 30 $mg/cm^3$ and preferably between 10 and 20 $mg/cm^3$ of the felt is disposed in the cathode space.

In accordance with a concomitant feature of the invention, the felt in the cathode space is a tube in the form of a composite body with sulphur.

Other features which are considered as characteristic for the invention are set forth in the appended claims.

Although the invention is illustrated and described herein as embodied in an electrochemical storage cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
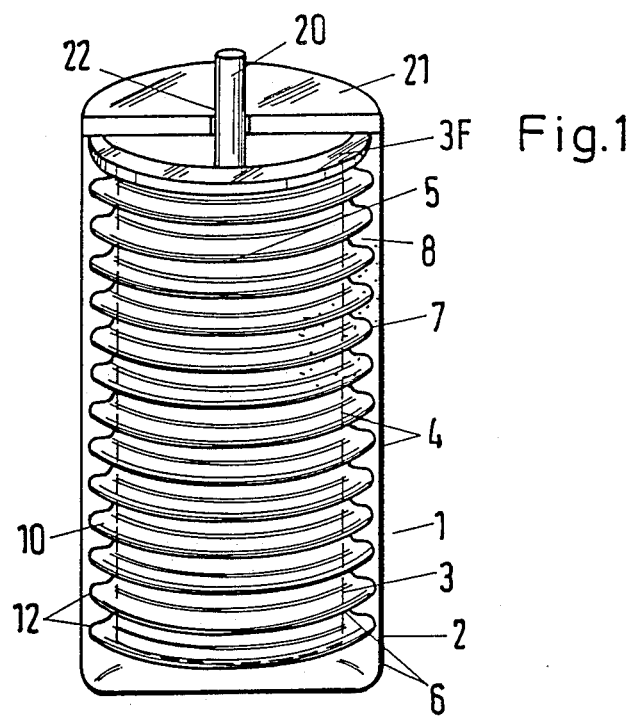
FIG. 1 is a diagrammatic, partly broken-away perspective view of an electrochemical storage cell with a folded felt in a cathode space.
Figure 2:
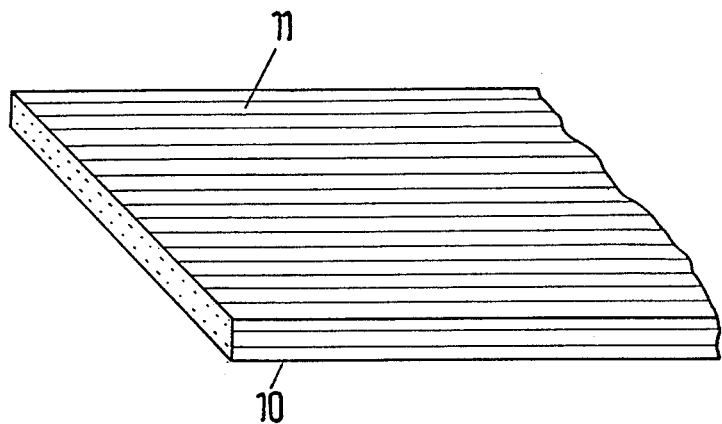
FIG. 2 is a fragmentary perspective view of an as yet unfolded felt.
Figure 3:
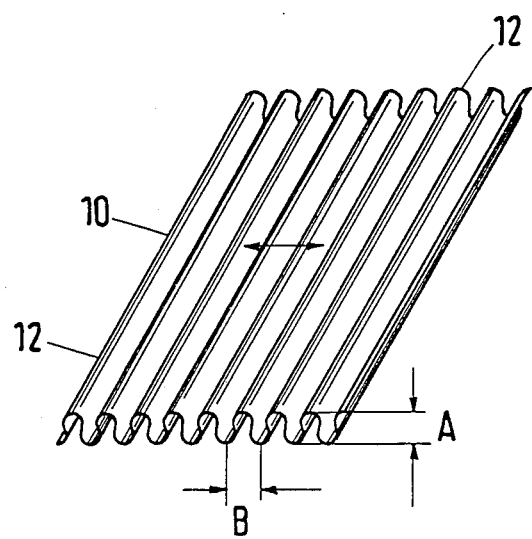
FIG. 3 is a perspective view of the felt folded to form a sulphur electrode.

Referring now to the figures of the drawings in detail and first, particularly, to FIG. 1 thereof, there is seen a portion of an electrochemical storage cell 1 which is essentially formed of a beaker-shaped housing 2 and a solid electrolyte 3. The solid electrolyte 3 also has a beaker-shaped construction and is disposed inside the housing 2. The dimensions of the solid electrolyte 3 are chosen in such a way that a continuous gap 4, which serves as the cathode space, is formed between the inner surface of the housing 2 and the outer surface of the solid electrolyte 3. An anode space 5, which is filled with sodium, is formed in the interior of the solid electrolyte 3. A sulphur electrode 6, which is formed by a felt 7 impregnated with sulphur 8, is disposed in the cathode space 4. The felt 7 is formed of graphite fibers and the graphite is manufactured from pitch. Such felts have an electrical resistance which is relatively high compared with felts formed of natural graphite and a very low restoring force. Therefore, as can be seen by reference to FIG. 1, the felt is disposed in the cathode space 4 in folded form with a radial alignment of the fibers 11 since the folds annularly surround the longitudinal axis of the storage cell. In order to form the felt, a mat 10 which is shown in FIG. 2 is first produced. In order to produce the mat 10, graphite, charcoal or carbon fibers 11 based on pitch are disposed in such a way that the longitudinal axes thereof are essentially parallel to each other. Preferably, the mat to be inserted in the cathode space has a thickness of 4–6 mm. The width and the height of the mat 10 are determined by the dimensions of the cathode space 4. The length and the width of the mat 10 are determined by the manner in which the mat is disposed in the cathode space. In particular, consideration has to be given in this connection to the disposition which the longitudinal axes of folds 12 shown in FIG. 3 should have with respect to the longitudinal axis of the cathode space. After the mat shown in FIG. 2 has been cut to the desired length and width, it is folded in the form shown in FIG. 3. According to the invention, the mat 10 is folded in such a manner that the longitudinal axes of the folds extend perpendicular to the longitudinal axis of the mat. The height A and the width B of the folds 12 are determined by a defined ratio. The ratio of width to height should lie within the limits of 0.2:1 to 2:1. The preferred embodiments of the felt have a ratio of width to height which is between 0.5:1 and 1:1. In the case of the storage cell shown in FIG. 1, the felt 7 is inserted into the cathode space 4 in such a way that the longitudinal axes of the folds 12 extend annularly around the longitudinal axis of the storage cell 1. The length of the mat 10 therefore has to be so chosen before the folds 12 are formed so that the length of the folded mat 10 matches the height of the cathode space 4. In order to form the storage cell 1, in particular in order to form the sulphur electrode 6, the mat shown in FIG. 10 may be provided with the desired folds 12 during the insertion thereof into the cathode space 4. A further possibility for introducing a folded felt 7 into the cathode space 4 is to produce a tube formed of a folded felt and sulphur, outside the storage cell. The dimensions of the tube are chosen in such a way that it can be inserted into the gap 4 between the housing 2 and the solid electrolyte 3. A tool is used with an annular gap having dimensions approximately corresponding to those of the cathode space 4.

The carbon or graphite mat is pushed into the annular gap of the tool so that folds can form as in FIG. 1. Liquid sulphur is then introduced into the tool which is heated to approximately 120°–150° C. Subsequently, the whole assembly is cooled down. After the sulphur has solidified, the tube produced in this manner and formed of the folded felt and the sulphur is withdrawn from the tool. A continuous operation such as extruding, is equally conceivable, so an infinitely long tube is produced from which the necessary lengths for the storage cell 1 are cut off.

In the storage cell 1 shown in FIG. 1, the metallic housing may be manufactured from aluminum and coated with a non-illustrated corrosion-protection layer on the inner surface thereof. In order to provide corrosion protection, a material must be used which has a good electrical conductivity because the housing of the storage cell simultaneously serves as cathodic current collector. An anodic current collector is formed by a rod 20 which projects far into the interior region of the solid electrolyte 3. The upper end of the solid electrolyte is joined to a ring 3F of alpha aluminum oxide which serves as a flange. The ring 3F is t the same time permanently joined to the inner surface of the housing 2, as a result of which the cathode space 4 situated between the solid electrolyte 3 and the housing 2 is sealed from the outside. The anode space 5 is sealed from the outside by a lid 21 which is also hermetically joined to the housing 2. The anodic current collector 20 is passed through the lid 21 in an insulated manner and projects a few millimeters outward. The insulation is indicated by reference numeral 22.

Figure 4:
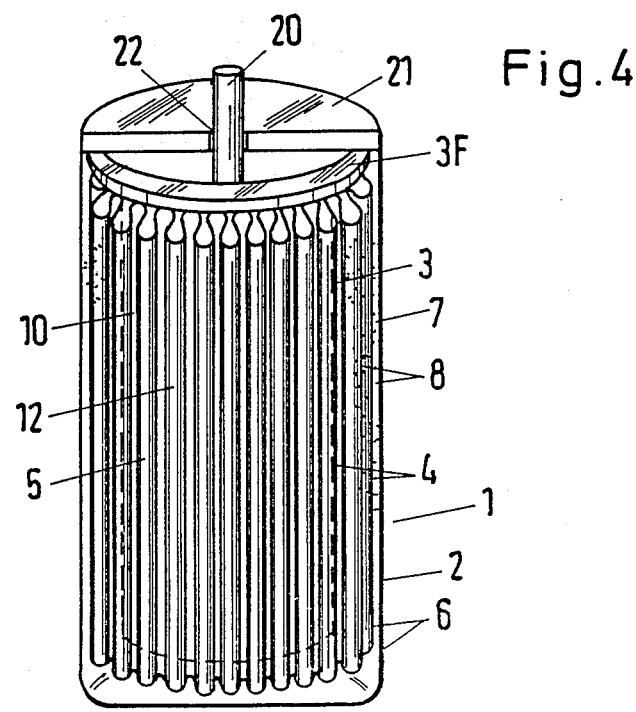
FIG. 4 is a view similar to FIG. 1 of another embodiment of a disposition of the felt inside the cathode space.

FIG. 4 shows a further embodiment of the storage cell 1 according to the invention. The difference between the storage cells 1 as shown in FIG. 1 and FIG. 4 is only in the disposition of the felt 7. Identical components are provided with the same reference symbols. The cathode space 4 in this case is also disposed between the housing 2 and the solid electrolyte 3. The electrode 6 is again formed by a felt 7 which is impregnated with sulphur 8. As FIG. 4 shows, the felt 7, in particular the mat 10 which forms it, is disposed inside the cathode space 4 in such a way that the longitudinal axes of the folds 12 extend parallel to the longitudinal axis of the storage cell 1. As in the case of the storage cell 1 shown in FIG. 1 and explained above, the felt 7 may be folded in the manner and means shown during insertion into the cathode space 4. On the other hand, a non-illustrated tool may also be used for this purpose, wherein the felt is first formed into a tube and folded inside the tool, and the tube can be subsequently inserted into the cathode space.

According to the invention, the sulphur electrode 6 may also be formed of several felt pieces. In this case, care has to be taken to ensure that the length of the non-illustrated felt pieces form a defined ratio with the width of their folds 12. The ratio between the length of the felt pieces and the width of the folds 12 should be between 5:1 and 20:1. A preferred ratio is 10:1. The quantity of felt to be introduced into the cathode space 4 should be between 5 and 30 mg/cm$^3$ for every embodiment. Preferably, a quantity of felt between 10 and 20 mg/cm$^3$ should be inserted into the cathode space 4.

The foregoing is a description corresponding in substance to German Application P No. 37 16 735.9, dated May 19, 1987, the International priority of which is being claimed for the instant application, and which is hereby made part of this application. Any material discrepancies between the foregoing specification and the aforementioned corresponding German application are to be resolved in favor of the latter.

We claim:

1. Electrochemical storage cell based on sodium and sulphur, comprising a metallic housing, a solid electrolyte disposed in said housing and defining an anode space and a cathode space mutually separated by said solid electrolyte and outwardly bounded by said housing, and a felt disposed in said cathode space to form an electrode, said felt being impregnated with sulphur and folded at least twice, and said felt having graphite or carbon fibers disposed substantially perpendicular to the longitudinal axis of the storage cell and substantially perpendicular to the surface of said solid electrolyte.

2. Electrochemical storage cell according to claim 1, wherein said felt is formed of a continuous mat, said fibers are mutually parallel inside said mat, and said felt has folds with a ratio of width to height of substantially between 0.2:1 and 2:1.

3. Electrochemical storage cell according to claim 1, wherein said felt is formed of a continuous mat, said fibers are mutually parallel inside said mat, and said felt has folds with a ratio of width to height of substantially between 0.5:1 and 1:1.

4. Electrochemical storage cell according to claim 1, wherein said felt forming said electrode is formed of a plurality of felt pieces having folds, the length of said felt pieces and the width of said folds having a ratio substantially between 5:1 and 20:1.

5. Electrochemical storage cell according to claim 1, wherein said felt forming said electrode is formed of a plurality of felt pieces having folds, the length of said felt pieces and the width of said folds having a ratio of substantially 10:1.

6. Electrochemical storage cell according to claim 2, wherein said folds extend substantially perpendicular to the longitudinal axis of said mat.

7. Electrochemical storage cell according to claim 1, wherein said felt inside said cathode space has folds with longitudinal axes extending annularly around the longitudinal axis of the storage cell.

8. Electrochemical storage cell according to claim 1, wherein said felt inside said cathode space has folds with longitudinal axes extending parallel to the longitudinal axis of the storage cell.

9. Electrochemical storage cell according to claim 1, wherein substantially between 5 and 30 mg/cm$^3$ of said felt is disposed in said cathode space.

10. Electrochemical storage cell according to claim 1, wherein substantially between 10 and 20 mg/cm$^3$ of said felt is disposed in said cathode space.

11. Electrochemical storage cell according to claim 1, wherein said felt in said cathode space is a tube in the form of a composite body with sulphur.

* * * * *